(12) United States Patent
Scholz et al.

(10) Patent No.: US 6,951,364 B2
(45) Date of Patent: Oct. 4, 2005

(54) LOCKING DEVICE FOR A REMOVABLE TOP

(75) Inventors: Andre Scholz, Wiernsheim (DE); Reiner Armbruster, Muehlacker (DE); Wolfgang Braun, Ebersbach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/788,251

(22) Filed: Feb. 27, 2004

(65) Prior Publication Data
US 2004/0232738 A1 Nov. 25, 2004

(30) Foreign Application Priority Data
Feb. 28, 2003 (DE) ......................................... 103 08 765

(51) Int. Cl.[7] .................................................. B60J 7/19
(52) U.S. Cl. .................. 296/121; 296/218; 292/341.14; 292/DIG. 5
(58) Field of Search ................................ 296/121, 218; 292/341.14, DIG. 5

(56) References Cited

U.S. PATENT DOCUMENTS

| | | | |
|---|---|---|---|
| 2,520,195 A | * | 8/1950 | Bienek .................. 292/341.14 |
| 4,664,436 A | | 5/1987 | Eyb |
| 6,398,327 B1 | | 6/2002 | Momoze |

FOREIGN PATENT DOCUMENTS

| | | | |
|---|---|---|---|
| DE | 3413379 C2 | | 2/1986 |
| DE | G9412827.8 | * | 11/1994 |
| DE | 19946926 C1 | | 10/2000 |
| DE | 10033464 A1 | | 6/2001 |
| JP | 2004-44258 | * | 2/2004 |
| WO | WO 00/03108 | * | 1/2000 |

* cited by examiner

Primary Examiner—Dennis H. Pedder
(74) Attorney, Agent, or Firm—Crowell & Moring LLP

(57) ABSTRACT

A locking device suitable for a removable top of a motor vehicle, which extends between fixed structures, such as a windshield frame and an anti-roll bar of a vehicle body, includes a locking element on the roof, which works together with a mounting that is attached, for example, to the anti-roll bar, is directed towards the passenger compartment, and is provided in a fastening plate. The fastening plate, which may be attached to the anti-roll bar, includes a cover element, which can be displaced from a first position into a second position covering the mounting of the fastening plate and vice versa.

8 Claims, 2 Drawing Sheets

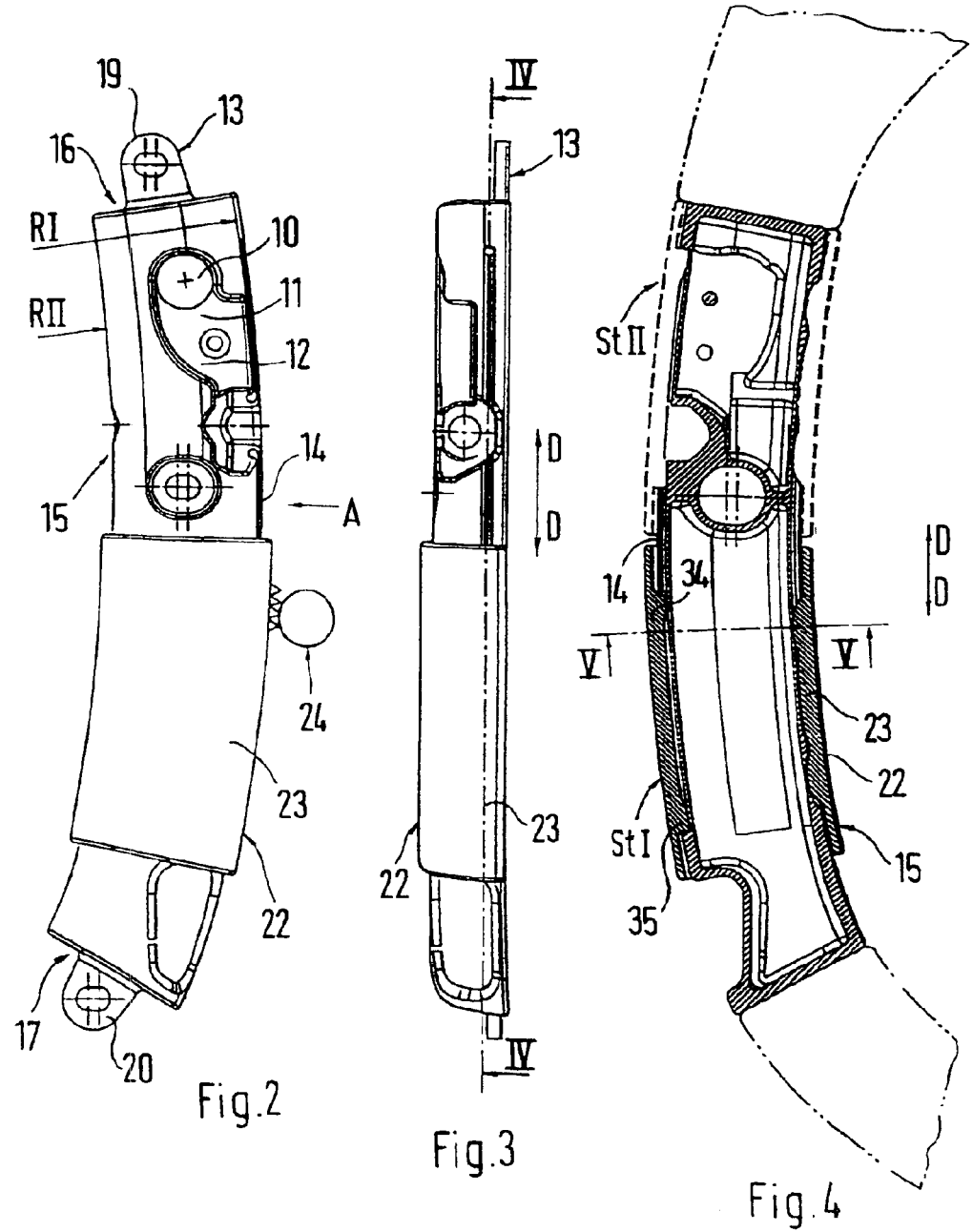

LOCKING DEVICE FOR A REMOVABLE TOP

This application claims the priority of German application 103 08 765.6, filed Feb. 28, 2003, the disclosure of which is expressly incorporated by reference herein.

Cross-references to commonly assigned U.S. patent application Ser. No. 10/787,250, titled LOCK FOR A REMOVABLE ROOF, filed Feb. 27, 2004, Ser. No. 10/787,249, titled REMOVABLE ROOF FOR A MOTOR VEHICLE, filed Feb. 27, 2004, and Ser. No. 10/788,252, titled REMOVABLE ROOF FOR A MOTOR VEHICLE, filed Feb. 27, 2004, are hereby made.

BACKGROUND AND SUMMARY OF THE INVENTION

The present invention relates to a locking device for a removable top of a motor vehicle which extends between fixed structures and includes a locking element on the roof, which works together with a mounting that is attached to at least one of the fixed structures, is directed towards the passenger compartment, and is provided in a fastening plate.

A locking device of the above-described kind, known from German document DE 34 13 379 C2, includes a locking member on a folding top and a mounting for the locking member on a windshield frame. The mounting is attached to a fastening plate and is designed like a slotted guide track, which is open towards the passenger compartment and is not covered in the open position of the folding top.

German document DE 199 46 926 C1 discloses a vehicle top with a sliding roof element, which runs with a longitudinal beam along a lateral roof pillar. The longitudinal beam has a U-shaped cross-section, with an open side which is directed to the passenger compartment. This open side is covered with a sliding shrouding, which is attached to a leg of the U-shaped cross-section by a hinge-like element.

It is one object of the invention to provide such a mounting of a locking device for a removable top of a motor vehicle that, when the roof is detached from the vehicle, the mounting is protected from functionally disruptive deposits settling there and the passengers of the motor vehicle are protected from abrasion-related and grease particles originating from the mounting.

This object is achieved pursuant to the invention by having the fastening plate attached to the fixed structure, and a cover element, provided on the fastening plate, which can be displaced from a first position into a second position covering the mounting of the fastening plate and vice versa. Additional features of the invention are defined by the dependent claims.

Benefits achieved with the invention include that, with the roof removed, the mounting in the fastening plate can be covered with the sliding cover element in the second position so that possible abrasion-related and/or grease particles that are discharged from the mounting do not affect the passengers of the motor vehicle or their clothing. Likewise, the cover element, which is designed as a sliding element on the fastening plate, prevents undesirable deposits from reaching the mounting, which could lead to functional problems of the locking device. The sliding element also permits optimization with regard to style. Finally, the guide elements ensure a functionally appropriate interaction of the sliding element with the fastening plate, and they can be implemented easily from a manufacturing point of view.

BRIEF DESCRIPTION OF THE DRAWINGS

The drawings show an embodiment of the invention, which is explained in more detail in the following.

FIG. 2 is a sectional view along line II—II of FIG. 1, FIG. 3 is a view in the direction of the arrow A of FIG. 2, FIG. 4 is a sectional view along line IV—IV of FIG. 3.

DETAILED DESCRIPTION OF THE INVENTION

Figure 1:
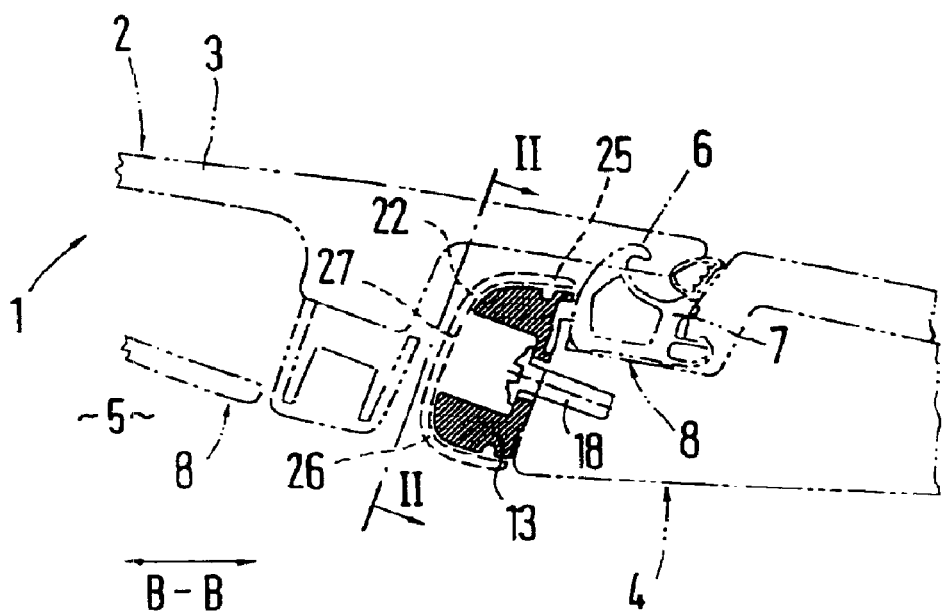
FIG. 1 is a partial longitudinal sectional view of a body of a motor vehicle in the area of a removable top.

From a motor vehicle 1 only partial areas of a body 2 are shown, which comprises a removable top 3 that can be stored in a stowage compartment and fixed structures in the shape of a windshield frame—not shown—and an anti-roll bar 4 that extends transversely to the vehicle longitudinal direction B—B. The dimensionally stable top 3, which can be made for example of plastic, covers a passenger compartment 5 and rests with a rear roof wall 6 on a sealing element 7, which rests in a groove 8 of the anti-roll bar 4. A locking device is integrated between the top 3 and the anti-roll bar 4. The locking device keeps the top 3 on the anti-roll bar 4 in its position and comprises a locking element 10 and a mounting 11; an appropriate design can be seen in German document DE 34 13 379 C2 mentioned above. The locking element 10 operates together with the mounting 11, designed as a slotted link 12, into which a fastening plate 13 is integrated and is aligned towards the passenger compartment 5, i.e. open and also visible when the roof 3 is detached from the vehicle 1. The fastening plate 13 that runs transversely to the vehicle longitudinal direction B—B has an elongated or rectangular base shape with an upper longitudinal side 14 and a lower longitudinal side 15, which are delimited by lateral sides 16, 17. Beyond that, the fastening plate 13 is attached to the anti-roll bar 4 by means of screws 18, which penetrate fastening eyes 19, 20 on the lateral sides 16, 17 or a through hole between the fastening eyes 19, 20 of the fastening plate 13.

A cover element 22 is provided on the fastening plate 13. The cover element can be displaced from a first position StI into a second position StII and vice versa, and runs in the direction D—D, which runs transversely to the vehicle longitudinal direction B—B. When in the second position StII, the cover element 22 encases the slotted link 12 and/or the mounting 13 for the locking element 10 completely. The cover element is designed as a sliding element 23, which may be manual. A motorized displacement of the cover element 22, for example by means of an electric motor 24, is also feasible.

Figure 5:
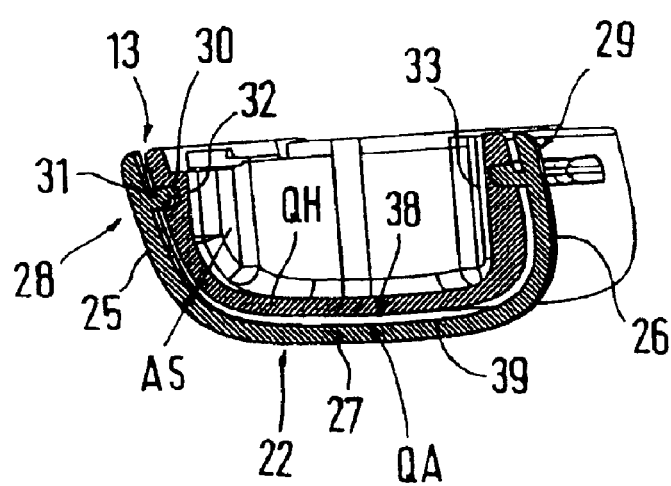
FIG. 5 is a sectional view along line V—V of FIG. 4.

FIGS. 1 and 5 show that the fastening plate 13 made of metal has a U-shaped cross-section QH, which is enclosed by a corresponding cross-section QA of the cover element 22. The U-shaped cross-section QA of the cover element 22 made of plastic comprises legs 25, 26 between which a connecting bar 27 extends. The sliding element 23 operates together with the fastening plate 13 with the involvement of guiding devices 28, 29. Each guiding device, e.g. 28, comprises a guide recess 30 and a guide pin 31 engaging the latter, which are provided on the fastening plate 13 or on the sliding element 23. Due to the design involving the U-shaped cross-section QH and QA, one guiding device each, namely 28 and 29, is arranged between the legs 25 or 26 and the adjacent areas 32, 33 of the fastening plate 13.

In the illustrated embodiment, as is apparent from FIGS. 4 and 5, the guide pins 31 are provided only on e.g. spaced partial sections 34 and 35 along the length of the cover element 22. A defined distance AS is provided between the exterior side 38 of the cross-section QH of the fastening plate 13 and the interior side 39 of the cross-section QA of the cover element. Finally, as best shown in FIG. 2, the upper longitudinal side 14 and the lower longitudinal side 15 of the fastening plate 13 are located on circular tracks RI and RII, respectively, and the legs 25, 26 of the cover element 22 follow those circular tracks.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Locking device for a removable top of a motor vehicle, which extends between fixed structures, the locking device comprising:
    a locking element on the roof which works together with a mounting that is attached to at least one of the fixed structures and is provided in a fastening plate that is attached to the at least one of the fixed structures, and
    a cover element, provided on the fastening plate, which can be displaced from a first position into a second position covering the mounting of the fastening plate and vice versa,
    wherein the fastening plate has a substantially U-shaped cross-section, which is surrounded by a corresponding cross-section of the cover element comprising legs and a connecting bar.

2. Locking device according to claim 1, wherein one guiding device is provided between each of the legs of the cover element and the fastening plate.

3. Locking device according to claim 1, wherein a defined distance is provided between an exterior side of the cross-section of the fastening plate and an interior side of the cross-section of the cover element.

4. Locking device according to claim 1, wherein an upper longitudinal side and a lower longitudinal side of the fastening plate are located on circular tracks, and wherein the legs of the cover element follow said circular tracks.

5. Locking device according to claim 1, wherein the cover element works together with the fastening plate by way of at least one guiding device.

6. Locking device according to claim 5, wherein each guiding device comprises a guide recess and a guide pin acting together with said guide recess.

7. Locking device according to claim 6, wherein the guide recess is provided on the fastening plate and the guide pin is provided on the cover element.

8. Locking device according to claim 6, wherein the guide pins are provided only on spaced partial sections along the length of the cover element.

* * * * *